United States Patent
Chen et al.

[11] Patent Number: 5,953,053
[45] Date of Patent: Sep. 14, 1999

[54] TELECONFERENCE SYSTEM WITH VISUAL DISPLAY TERMINAL

[75] Inventors: Diana Chen, Gilbert; Davis H. Hartman, Phoenix, both of Ariz.

[73] Assignee: Motorola, Inc., Schaumburg, Ill.

[21] Appl. No.: 09/145,807

[22] Filed: Sep. 2, 1998

[51] Int. Cl.[6] .......................................... H04N 7/14
[52] U.S. Cl. ................... 348/20; 348/14; 348/16
[58] Field of Search ................... 348/14, 16, 20; 379/93.17, 110.01; 359/571, 629, 638, 639, 640

[56] References Cited

U.S. PATENT DOCUMENTS

| | | | |
|---|---|---|---|
| 5,532,736 | 7/1996 | Kuriki et al. | 348/20 |
| 5,612,734 | 3/1997 | Nelson et al. | 348/20 |
| 5,666,155 | 9/1997 | Mersereau | 348/20 |
| 5,856,842 | 1/1999 | Tedesco | 348/20 |

OTHER PUBLICATIONS

S12–3: Resolution analysis of Eye–Contact Technique Using BHM, 1992.

Primary Examiner—Curtis A. Kuntz
Assistant Examiner—Melur Ramakrishnaiah
Attorney, Agent, or Firm—Eugene A. Parsons; William E. Koch

[57] ABSTRACT

A teleconference system including a display terminal composed of an image source, a plurality of optical elements, a display screen and a planar optical structure associated with an outermost surface of the display screen; a video camera positioned to receive a reflected image from the display screen and a transmission link to a distant teleconference system. The planar optical structure is formed integral the display screen, such as through molding, or the like, or alternatively affixed to the outermost surface of the display screen in the form of a coating, or a plastic of glass element. The planar optical structure includes a blazed grating, thereby providing for the transmission therethrough of a portion of light and the reflectance of a portion of light incident thereon.

15 Claims, 1 Drawing Sheet

TELECONFERENCE SYSTEM WITH VISUAL DISPLAY TERMINAL

FIELD OF THE INVENTION

The present invention pertains to the field of communication devices, and more particularly to a teleconference system including a visual display terminal that utilize optical properties to direct light.

BACKGROUND OF THE INVENTION

The human visual system is a complex system with a great ability to absorb vast amounts of information originating in many varying formats, including visual displays. Visual displays are found in varying sizes and forms in today's world, displaying many types of information, from large visual display screens announcing scheduling information found in airports, to small visual displays, such as those incorporated into pocket calculators. Of current concern is the display of images when utilizing teleconferencing technology and teleconference display devices.

Face-to face conversation is universally recognized as the preferred form of human communication. In a typical teleconferencing system, a pair of terminals, each with a video camera and a video display device, a microphone, and a speaker, are connected by a telecommunication link to permit face-to-face communication at a distance. However, such systems known today while utilizing this face-to-face communication standard have failed to address that communication is best when video conference communicants have eye-contact with each other.

In a typical videoconferencing terminal, the video camera and the video display are not in line with one another. The communicant has to either face the camera or the display, resulting typically in an image that captures the communicant's face staring off into space. No eye-contact is possible with the communicant during the teleconference because of the need to have eye-contact with the display.

Prior attempts to solve this problem have utilized a half-silvered mirror in front of the display terminal with a camera positioned behind it. The problem with this arrangement is that the video display no longer offers a front-surface view, but an image that is recessed into the terminal. Accordingly, the sense of immediance, thus presence is lost.

Other attempts to create eye contact by placing a video projection source behind a liquid crystal screen and in-line with the video camera have been suggested. This type of system operates in two modes, an image capture mode and an image display mode. During the image display mode, the liquid crystal screen is translucent and serves as a rear-projection screen to display the image of the distant communicant. During the image capture mode, the liquid crystal screen is transparent and the video camera detects the image of the local communicant, or participant. This type of system requires a vast amount of space for the projection display and typically requires conference facility modification. This modification requirement increases the cost of teleconferencing substantially. In addition, this type of system can only be utilized with projection displays and is not applicable to CRT displays, TFT liquid crystal displays, field emission displays, and the new emerging plasma displays.

Thus, there is a need for a teleconferencing system including a display terminal that includes the ability to display an image and transmit an image while maintaining eye-contact between the system communicants.

Accordingly, it is highly desirable to provide for a teleconference system including a display terminal that provides for the maintenance of eye-contact between the local and distant communicants.

It is a purpose of the present invention to provide for a new and improved teleconference system including a display terminal that provides for the in-line transmission of images, thus achieving eye-contact between a distant and local communicant.

It is a further purpose of the present invention to provide for a new and improved teleconference display terminal that includes optical properties so as to serve the local communicant as a mirror to reflect the communicants image toward a video transmission camera, and as a display screen to display the distance communicant's image.

It is yet still another purpose of the present invention to include a blazed grating on a surface of a display terminal thereby providing for the reflectance of a local communicant's image to a video camera positioned at an angle thereto, while simultaneously serving as a display screen to display the image of a distant communicant.

SUMMARY OF THE INVENTION

The above problems and others are substantially solved and the above purposes and others are realized in a teleconference system including a display terminal composed of an image source, a plurality of optical elements, a display screen and a planar optical structure associated with an outermost surface of the display screen; a video camera positioned to receive a reflected image from the display screen and a transmission link to a distant teleconference system. The planar optical structure is formed integral the display screen, such as through molding, or the like, or alternatively affixed to the outermost surface of the display screen in the form of a coating, or a plastic of glass element. The planar optical structure includes a blazed grating, thereby providing for the transmission therethrough of a portion of light and the reflectance of a portion of light incident thereon.

BRIEF DESCRIPTION OF THE DRAWINGS

The novel features believed characteristic of the invention are set forth in the claims. The invention itself, however, as well as other features and advantages thereof will be best understood by reference to detailed descriptions which follow, when read in conjunction with the accompanying drawings, wherein:

DETAILED DESCRIPTION OF THE PREFERRED EMBODIMENT

Figure 1:
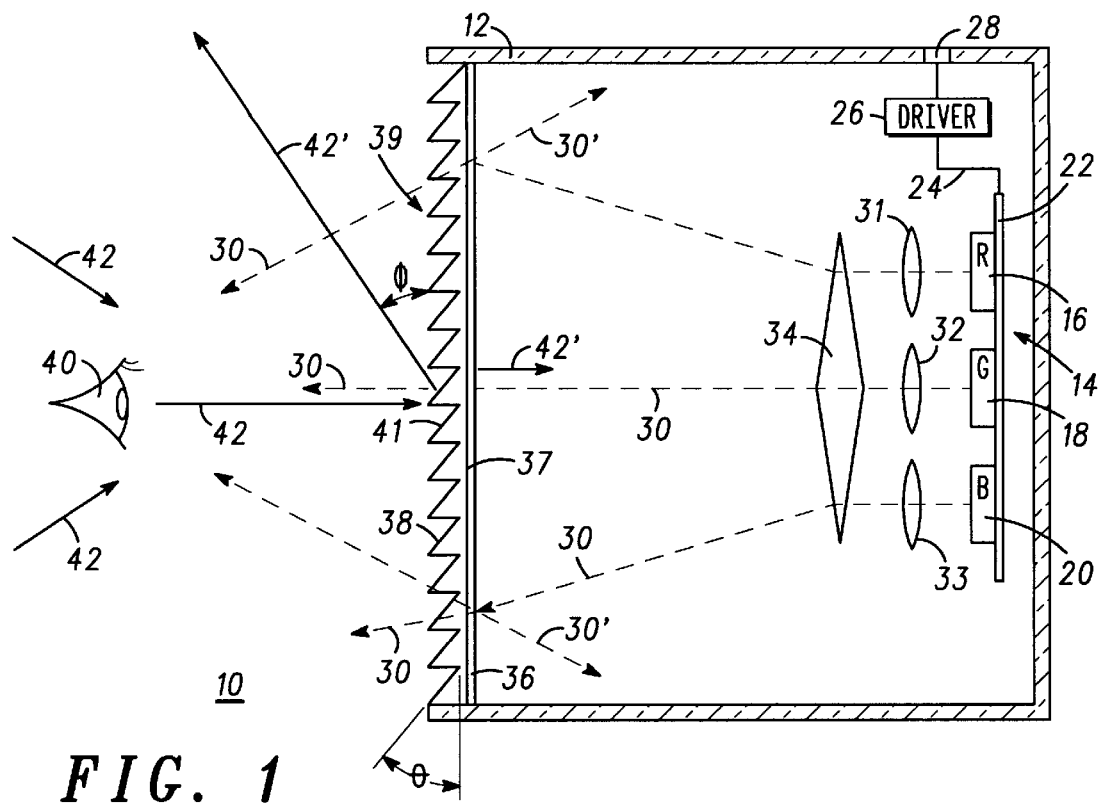
FIG. 1 is a simplified sectional view of a display terminal in accordance with the present invention.

During the course of this description, like numbers are used to identify like elements according to the different figures that illustrate the invention. The present invention provides for a teleconference system that includes a display terminal, to enable eye-to-eye contact between a local communicant and a distant communicant. As illustrated in FIG. 1, in simplified sectional view, shown is a display terminal 10. Display terminal 10 generally includes a housing 12, having housed therein an image source 14. In this particular embodiment, image source 14 includes a plurality of light emitting devices 16, 18 and 20 which emit red, green and blue light, as noted by "R", "G", and "B" in FIG. 1.

Alternatively, image source 14 includes a white light source and a field sequential color shutter to provide the red, green and blue color image source. It should be understood that while display terminal 10 is illustrated as a rear projection display, an alternate embodiment would include a direct view display. In addition, it should be understood that various sources of light or image generating devices can be utilized as image source 14 such as inorganic or organic light emitting diodes (LEDs), vertical cavity surface emitting lasers (VCSELs), cathode ray tubes (CRTs), field emission displays (FEDs), electroluminescent displays, plasma displays, liquid crystal displays (LCDs), etc., which may be formed in a two-dimensional array. The general term "light emitting devices" will be utilized throughout this disclosure for the sake of simplicity.

In this particular embodiment, light emitting devices 16, 18 and 20 are mounted on a printed circuit board (PCB) 22. A plurality of electrical interconnects 24 connect PCB 22 to a driver source 26 and ultimately to an external interface 28 for integration with the teleconference system, discussed presently. Light 30 is emitted by light emitting devices 16, 18 and 20 toward a plurality of optical elements 31, 32, 33 and 34. Optical elements 31, 32, 33 and 34 include optical properties such as optical magnification, thereby serving as an optical magnification system, optical direction, optical combination, aberration correction, or the like.

There is provided a display screen 36 in alignment with light 30 on which a viewer views a displayed image. A planar optical structure 38 is positioned on an outermost surface 37 of display screen 36. In this particular embodiment, planar optical structure 38 is fabricated as a separate element, that is attached to surface 37 of display screen 36. Planar optical structure 38, as discussed presently, provides for the transmission therethrough of light 30 emitted by light emitting devices 16, 18 and 20, thereby the image of distant communicants to a local communicant(s) 40 during operation. In addition, during operation of display terminal 10, light 42 incident upon display terminal 10, more particularly planar optical structure 38, is partially reflected by planar optical structure 38, referenced as light 42'. In this particular embodiment, where display terminal 10 is utilized as part of a teleconference system, discussed presently, an image of local communicant 40 is reflected by planar optical structure 38 in a direction toward a video camera (discussed presently).

Planar optical structure 38 includes a polymer coating to control the reflectivity of light passing therethrough (not shown) and a blazed optical grating 39 which is integrally molded into surface 37 of display screen 36, or alternatively, planar optical structure 38 is formed as a separate glass or plastic structure. Planar optical structure 38 can be coated so that light with one polarization is transmitted and the other polarization is reflected or vice versa.

Figure 2:
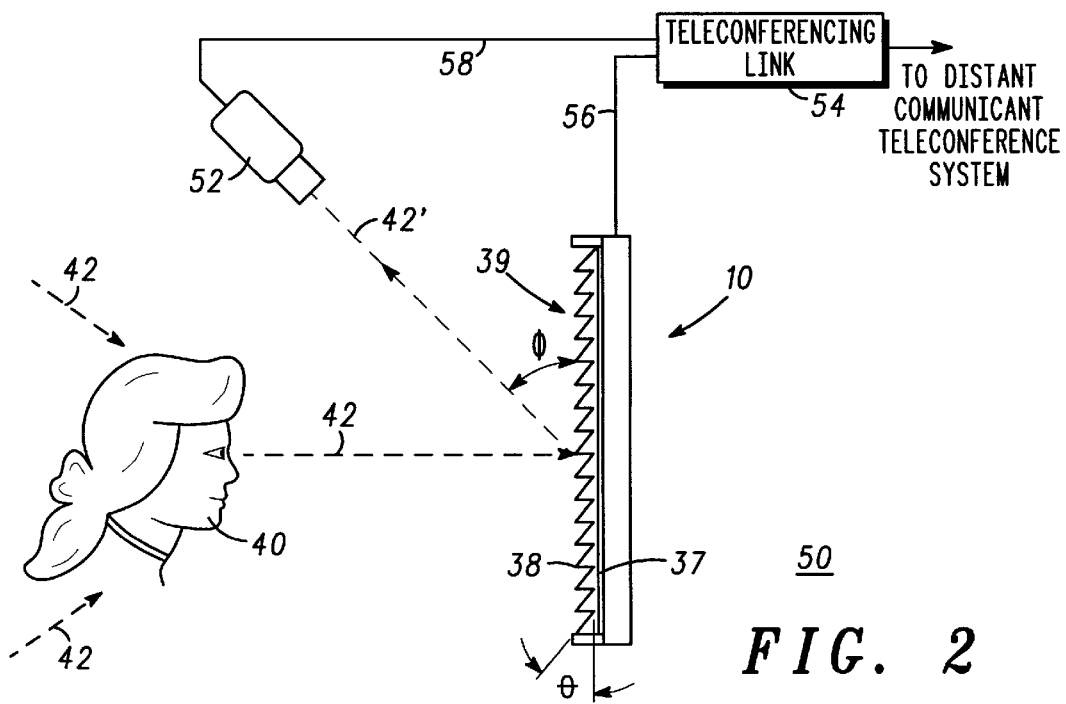
FIG. 2 is a simplified schematic view of a teleconference system incorporating the display terminal according to the present invention.

Blazed optical grating 39 is fabricated to provide for the deflection of light 42, more particularly of an image of local communicant 40 to the local video camera. A beam deflection angle is generated as a function of the angle of the blazed optical grating 39 and the optical index n of the blazed grating material. Accordingly, in a teleconference system 50, such as that illustrated in FIG. 2, the angle of the blazed grating depends on the angle between a video camera 52 and display terminal 10. As illustrated in FIGS. 1 and 2, if the angle between camera 52 and terminal 10 is $\Phi$, and the blazed optical grating angle is $\phi$, then $n \sin \phi + \phi + \Phi = 90°$.

Teleconference system 50 as illustrated in FIG. 2, includes display screen 10, as previously described with reference to FIG. 1, video camera 52, a plurality of transmission lines 56 and 58 and teleconference link 54. During operation, a similar teleconference system is set up at a distant site and linked to teleconference system 50 through teleconferencing link 54.

During operation, an image of a distant communicant is transmitted via teleconferencing link 54 to local communicant 40. Local communicant 40 views the image on display terminal 10. Simultaneously, an image of local communicant 40 is reflected off planar optical structure 38 (of FIG. 1) toward video camera 52 and is transmitted via teleconferencing link 54 to the distant communicant. Accordingly, local communicant 40 and the distant communicant, appear to maintain eye-contact in that camera 52 and display 10 are in-line.

Thus, disclosed is a new and improved videoconference system with display terminal, which provides for eye-contact between the local communicant and the distant communicant due to the in-line positioning of the camera and display terminal. More particularly, the display terminal includes optical properties which provide for the viewing of an image by the local communicant while simultaneously transmitting an image of the communicant by reflecting an image of the communicant off the display terminal toward the video camera. In that eye-contact is achieved between the local communicant and the distant communicant, there exists a sense of immediacy and presence between the communicating parties.

While we have shown and described specific embodiments of the present invention, further modifications and improvement will occur to those skilled in the art. We desire it to be understood, therefore, that this invention is not limited to the particular forms shown and we intend in the appended claims to cover all modifications that do not depart from the spirit and scope of this invention.

What is claimed is:

1. A teleconference system which enables a distant communicant and a local communicant to have eye contact during a teleconference, the teleconference system comprising:

a local communicant display terminal, including a planar optical structure having a blazed optical grating fabricated at an angle equal to $n \sin \theta + \theta + \phi = 90°$ where $\theta$ is the angle of the blazed optical grating and where $\phi$ is the angle between a video camera and the display terminal, the local communicant display terminal characterized as permitting partial light to be transmitted therethrough and partial light to be reflected therefrom;

a local communicant video camera, positioned to receive the partial light reflected therefrom the local communicant display terminal, thus receiving an image of the local communicant;

a distant communicant display terminal, including a planar optical structure having a blazed optical grating fabricated at an angle equal to $n \sin \theta + \theta + \phi = 90°$ where $\theta$ is the angle of the blazed optical grating and where $\phi$ is the angle between a video camera and the display terminal, the distant communicant display terminal characterized as permitting partial light to be transmitted therethrough and partial light to be reflected therefrom;

a distant communicant video camera, positioned to receive the partial light reflected therefrom the distant communicant display terminal, thus receiving an image of the distant communicant; and a transmission link, linking the local communicant display terminal to the distant communicant video camera and the distant communicant display terminal to the local communicant video camera.

2. A teleconference system as claimed in claim 1 wherein the blazed optical grating is molded therein an outermost surface of a display screen formed as part of each of the display terminals.

3. A teleconference system as claimed in claim 1 wherein the blazed optical grating is formed as a separate element attached to an outermost surface of a display screen formed as a part of each of the display terminals.

4. A display terminal comprising:

an image source;

a plurality of optical elements positioned to direct light emitted from the image source;

a display screen positioned in line with the plurality of optical elements; and a planar optical structure including a blazed optical grating fabricated at an angle equal to n sin θ+θ+φ=90° where θ is the angle of the blazed optical grating and where φ is the angle between a remotely positioned video camera and the display screen, the planar optical structure positioned in line with the display screen and characterized as permitting partial light to be transmitted therethrough the display screen and partial light to be reflected therefrom the display screen.

5. A display terminal as claimed in claim 4 wherein the blazed optical grating is molded therein an outermost surface of the display screen.

6. A display terminal as claimed in claim 4 wherein the blazed optical grating is formed as a separate element attached to an outermost surface of the display screen.

7. A display terminal as claimed in claim 4 wherein the image source includes a plurality of light emitting devices.

8. A display terminal as claimed in claim 7 wherein the light emitting devices include one of inorganic light emitting diodes, organic light emitting diodes, field emission displays, cathode ray tubes, vertical cavity surface emitting lasers, liquid crystal displays, and electroluminescent devices.

9. A display terminal as claimed in claim 4 wherein the display terminal is formed as one of a projection display, or a direct view display.

10. A display terminal comprising:

a housing;

an image source housed within the housing;

a plurality of optical elements housed within the housing and positioned to direct light emitted from the image source;

a display screen positioned in line with the plurality of optical elements; and a planar optical structure including a blazed optical grating fabricated at an angle equal to n sinθ+θ+φ=90°, where θ is the angle of the blazed optical grating and where φ is the angle between a remotely positioned video camera and the display screen, the blazed optical grating formed on an outermost surface positioned in line with the display screen and characterized as permitting partial light to be transmitted therethrough the display screen and partial light to be reflected therefrom the display screen.

11. A display terminal as claimed in claim 10 wherein the plurality of optical elements form an optical magnification system, comprised of the plurality of optical elements, positioned so that light emitted by the image source is directed through the optical magnification system, thereby generating a resultant integrated image, viewable by an observer at the display screen.

12. A display terminal as claimed in claim 10 wherein the blazed optical grating is molded therein an outermost surface of the display screen.

13. A display terminal as claimed in claim 10 wherein the blazed optical grating is formed as a separate element attached to an outermost surface of the display screen.

14. A display terminal as claimed in claim 10 wherein the image source includes a plurality of light emitting devices including at least one of inorganic light emitting diodes, organic light emitting diodes, field emission displays, cathode ray tubes, vertical cavity surface emitting lasers, liquid crystal displays, and electroluminescent devices.

15. A display terminal as claimed in claim 10 wherein the display terminal is formed as one of a projection display, or a direct view display.

* * * * *